(12) United States Patent
Theunissen

(10) Patent No.: US 11,174,731 B2
(45) Date of Patent: Nov. 16, 2021

(54) SYSTEM AND METHOD FOR MEASURING AND ALIGNING ROOF BOLTS

(71) Applicant: Joy Global Underground Mining LLC, Warredale, PA (US)

(72) Inventor: Wilhelmus Hendrickus Theunissen, Gauteng (ZA)

(73) Assignee: JOY GLOBAL UNDERGROUND MINING LLC, Warredale, PA (US)

(*) Notice: Subject to any disclaimer, the term of this patent is extended or adjusted under 35 U.S.C. 154(b) by 112 days.

(21) Appl. No.: 15/952,567

(22) Filed: Apr. 13, 2018

(65) Prior Publication Data

US 2018/0298756 A1 Oct. 18, 2018

Related U.S. Application Data

(60) Provisional application No. 62/485,258, filed on Apr. 13, 2017.

(51) Int. Cl.
*E21D 20/00* (2006.01)
*E21B 7/02* (2006.01)
(Continued)

(52) U.S. Cl.
CPC .............. *E21D 20/00* (2013.01); *G01C 3/08* (2013.01); *G01C 3/14* (2013.01); *G06K 9/3216* (2013.01); *G06K 9/6288* (2013.01); *G06T 7/001* (2013.01); *G06T 7/62* (2017.01); *G06T 7/73* (2017.01); *B62D 11/02* (2013.01); *E21D 20/003* (2013.01); *G01V 1/00* (2013.01); *G01V 8/10* (2013.01); *G06T 2207/30108* (2013.01); *G06T 2207/30164* (2013.01)

(58) Field of Classification Search
CPC ....... E21D 20/003; E21D 9/003; E21D 9/004; E21B 7/025; E21C 41/16; E21F 17/18; G05D 2201/021
See application file for complete search history.

(56) References Cited

U.S. PATENT DOCUMENTS

| | | |
|---|---|---|
| 4,398,850 A | 8/1983 | Talvensaari |
| 4,865,390 A | 9/1989 | Shrader et al. |

(Continued)

FOREIGN PATENT DOCUMENTS

| | | |
|---|---|---|
| JP | H09250911 A | 9/1997 |
| JP | 3682461 B1 | 8/2005 |

(Continued)

OTHER PUBLICATIONS

International Preliminary Report on Patentability for Application No. PCT/US2018/027468 dated Oct. 24, 2019 (10 pages).

(Continued)

*Primary Examiner* — Benjamin F Fiorello
*Assistant Examiner* — Stacy N Lawson
(74) *Attorney, Agent, or Firm* — Michael Best & Friedrich LLP

(57) ABSTRACT

A industrial machine including a chassis, a first sensor configured to sense a roof bolt, a second sensor configured to sense the roof bolt, and a controller. The controller configured to receive sensor information from the first and second sensors, and determine a location of the roof bolt based on the sensor information from the first and second sensor.

14 Claims, 10 Drawing Sheets

(51) Int. Cl.
  *G06T 7/00* (2017.01)
  *G01C 3/08* (2006.01)
  *G01C 3/14* (2006.01)
  *G06K 9/62* (2006.01)
  *G06K 9/32* (2006.01)
  *G06T 7/62* (2017.01)
  *G06T 7/73* (2017.01)
  *B62D 11/02* (2006.01)
  *G01V 8/10* (2006.01)
  *G01V 1/00* (2006.01)

(56) References Cited

U.S. PATENT DOCUMENTS

| | | | |
|---|---|---|---|
| 5,680,048 A | 10/1997 | Wollny | |
| 5,824,912 A * | 10/1998 | Stankus | E21C 39/00 |
| | | | 73/786 |
| 6,349,249 B1 * | 2/2002 | Cunningham | E21D 9/004 |
| | | | 701/28 |
| 6,392,688 B1 | 5/2002 | Barman et al. | |
| 9,476,256 B2 | 10/2016 | Pursimo et al. | |
| 9,982,536 B2 | 5/2018 | Nystrom et al. | |
| 2003/0052529 A1 * | 3/2003 | Hakkinen | G05D 1/0246 |
| | | | 299/1.05 |
| 2008/0085161 A1 * | 4/2008 | Oberg | E21D 20/00 |
| | | | 405/259.1 |
| 2012/0319453 A1 | 12/2012 | Ahler et al. | |
| 2013/0106167 A1 | 5/2013 | Wilmer et al. | |
| 2015/0061351 A1 * | 3/2015 | Paterson | E21C 35/24 |
| | | | 299/1.4 |
| 2016/0001707 A1 | 1/2016 | Madera et al. | |
| 2016/0102551 A1 | 4/2016 | Paterson | |
| 2016/0123146 A1 * | 5/2016 | Makela | G05D 1/024 |
| | | | 701/50 |
| 2016/0333690 A1 | 11/2016 | Puura et al. | |
| 2016/0333691 A1 * | 11/2016 | Puura | E21C 35/24 |
| 2016/0341041 A1 * | 11/2016 | Puura | E21D 9/003 |
| 2017/0016325 A1 * | 1/2017 | Kouhia | E21C 39/00 |
| 2017/0138193 A1 * | 5/2017 | Kawai | G06Q 10/0631 |
| 2017/0142403 A1 | 5/2017 | Wang et al. | |
| 2019/0064820 A1 * | 2/2019 | Boswell | B60P 3/14 |

FOREIGN PATENT DOCUMENTS

| | | |
|---|---|---|
| PL | 2499333 T3 | 11/2014 |
| PL | 234537 B1 | 3/2020 |
| SU | 901552 A1 | 1/1982 |
| WO | 0218749 A1 | 3/2002 |
| WO | 2008010757 A1 | 1/2008 |
| WO | 2013098459 A1 | 7/2013 |
| WO | 2013170348 A1 | 11/2013 |
| WO | 2020130921 A1 | 6/2020 |

OTHER PUBLICATIONS

International Search Report with Written Opinion for related Application No. PCT/US18/27468 dated Aug. 27, 2018 (18 pages).
Search Report issued by the Polish Patent Office for Application No. 431444 dated May 7, 2020 (6 pages including English translation).
Office action issued by the Polish Patent Office for Application No. 431444 dated Oct. 20, 2020 (3 pages including statement of relevance).
European Patent Office Extended Search Report for Application No. 18/784,588 dated Dec. 9, 2020 (9 pages).
Intellectual Property India Patent Office Examination report for Application No. 201917044777 dated Sep. 15, 2021 (6 pages including English translation).
Russian Federal Service for Intellectual Property Office Action and Search Report for Application No. 2019136183/03 dated Aug. 4, 2021 (14 pages including English translation).

* cited by examiner

SYSTEM AND METHOD FOR MEASURING AND ALIGNING ROOF BOLTS

RELATED APPLICATIONS

This application claims the benefit to U.S. Provisional Patent Application No. 62/485,258, filed on Apr. 13, 2017, the entire contents of which are incorporated herein by reference.

FIELD

Embodiments relate to industrial machines, and in some embodiments, mining machines.

SUMMARY

In some underground mining operations, one or more roof bolts are driven into the roof or sidewalls of the mine to provide stability to the roof and sidewalls of the mine. The roof bolts may be installed using a roof bolter machine configured to drill holes into the roof and thereafter install a roof bolt along with a resin, in order to stabilize the roof or sidewalls and thereby prevent delamination and falls of the roof and sidewalls.

Roof bolts are typically installed according to a pre-approved bolting plan, which typically is a two-dimensional matrix of bolts arranged in a line across the span of the mine and in linear rows along the mine shaft. The pre-approved bolting plan includes set distances between roof bolts both across the span of the mine and along the mine shaft. Typically, the distances between the roof bolts, and the distances between the roof bolts closest to the sidewalls and the sidewalls is measured manually by an operator (for example, using a tape measure). Such measurements may be prone to human faults.

Thus, in one embodiment, the application provides a industrial machine including a chassis, a first sensor configured to sense a roof bolt, a second sensor configured to sense the roof bolt, and a controller. The controller configured to receive sensor information from the first and second sensors, and determine a location of the roof bolt based on the sensor information from the first and second sensors.

In another embodiment the application provides a method of operating a roof bolting apparatus. The method including sensing, via a first sensor, a roof bolt; sensing, via a second sensor, the roof bolt; and determining, via a controller, a location of the roof bolt based on sensing information from the first sensor and the second sensor.

In yet another embodiment, the application provides an industrial machine including a camera and a controller. The camera is configured to capture an image of an object. Wherein the captured image has a known capture area and the object has a known dimension. The controller is configured to receive the captured image from the sensor, and determine a location of the roof bolt, the location based on the captured image, the known captured area of the capture image, and the known dimension of the roof bolt.

Embodiments disclosed herein provide benefits, such as but not limited to, accurate measurements, accurate location determination, ensuring roof bolts are installed correctly according to a roof bolting plan, ensuring a roof of a mine is correctly supported, preventing mine closure due to incorrectly installed roof bolts, increase productivity due to correctly installed roof bolts, and increase productivity due to automatic measurements of the roof bolts.

Additionally, embodiments disclosed herein provide benefits, such as but not limited to, providing evidence of roof bolt installation, providing information and statistics to analyze roof bolt installation, providing means for planning and optimizing roof bolt installation, and providing means for education and training of roof bolt installation.

Other aspects of the application will become apparent by consideration of the detailed description and accompanying drawings.

DETAILED DESCRIPTION

Figure 1:
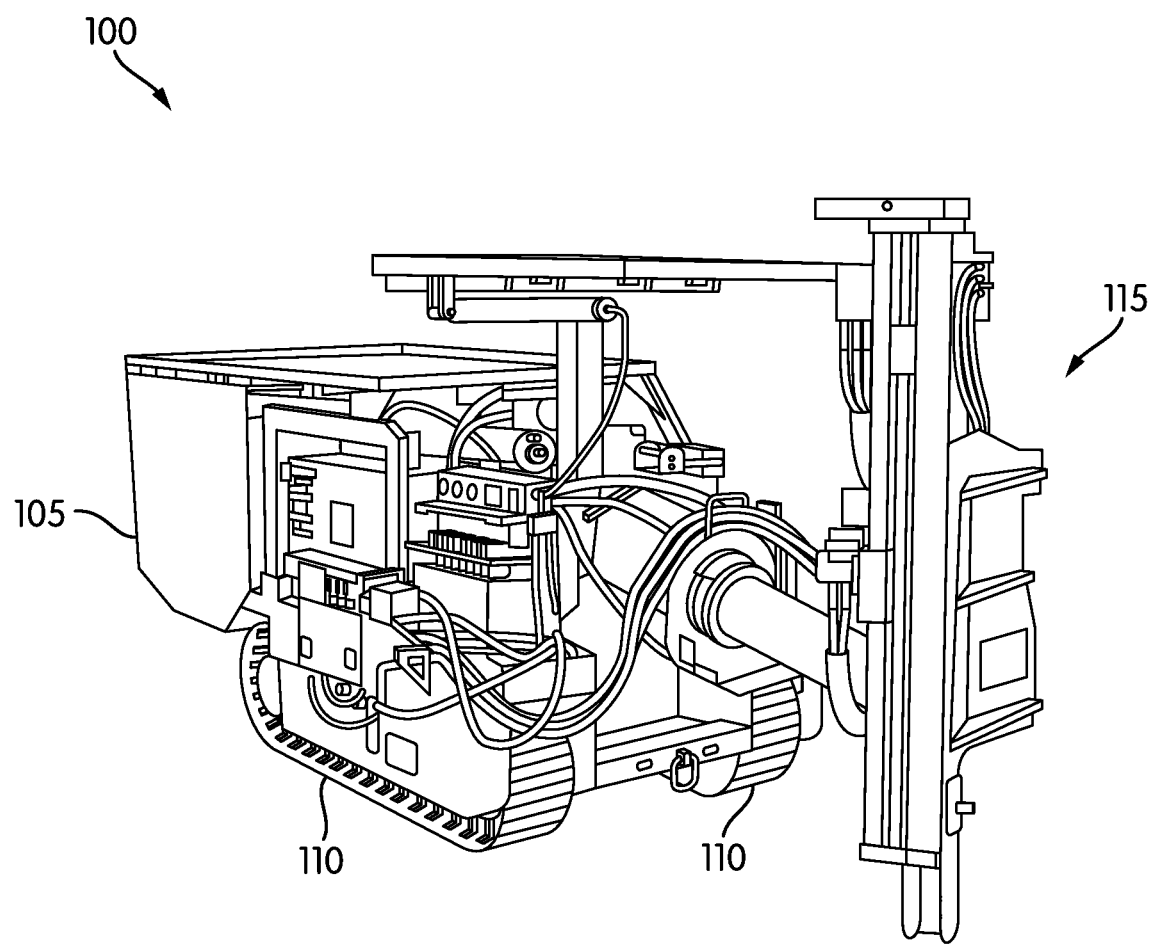
FIG. 1 is a perspective view of an industrial machine according to some embodiments.

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be used to implement the application. In addition, it should be understood that embodiments of the application may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the application may be implemented in software (e.g., stored on non-transitory computer-readable medium) executable by one or more processors. As such, it should be noted that a plurality of hardware and software based devices, as well as a plurality of different structural components may be utilized to implement the application. Furthermore, and as described in subsequent paragraphs, the specific mechanical configurations illustrated in the drawings are intended to exemplify embodiments of the application and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

FIG. 1 illustrates an industrial machine 100 according to some embodiments. In the illustrated embodiment, the industrial machine 100 is a roof bolter, or roof bolting machine. The industrial machine 100 includes a chassis 105 and one or more tracks 110 supporting the chassis 105 and propelling the industrial machine 100 forward and backward, and for turning the industrial machine 100 (i.e., by varying the speed and/or direction of the left and right tracks relative to each other). In other embodiments, rather than tracks 110, the industrial machine 100 may include other propulsion devices, such as but not limited to, one or more wheels. The industrial machine 100 further includes a bolting apparatus 115 supported by the chassis 105.

Figure 2:
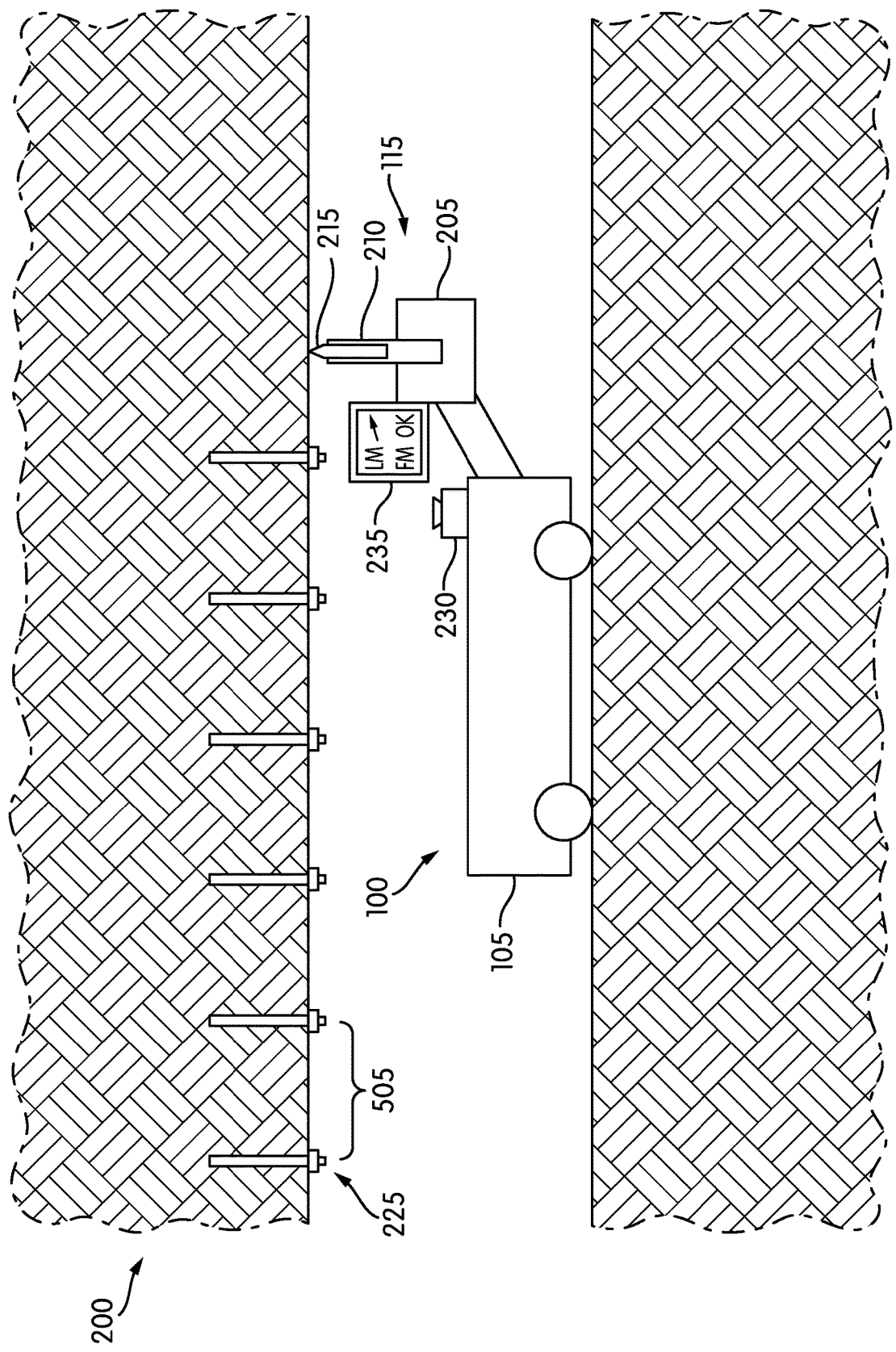
FIG. 2 is a partial, cross-sectional, side view diagram of a mine showing the industrial machine of FIG. 1 in the mine.
Figure 3:
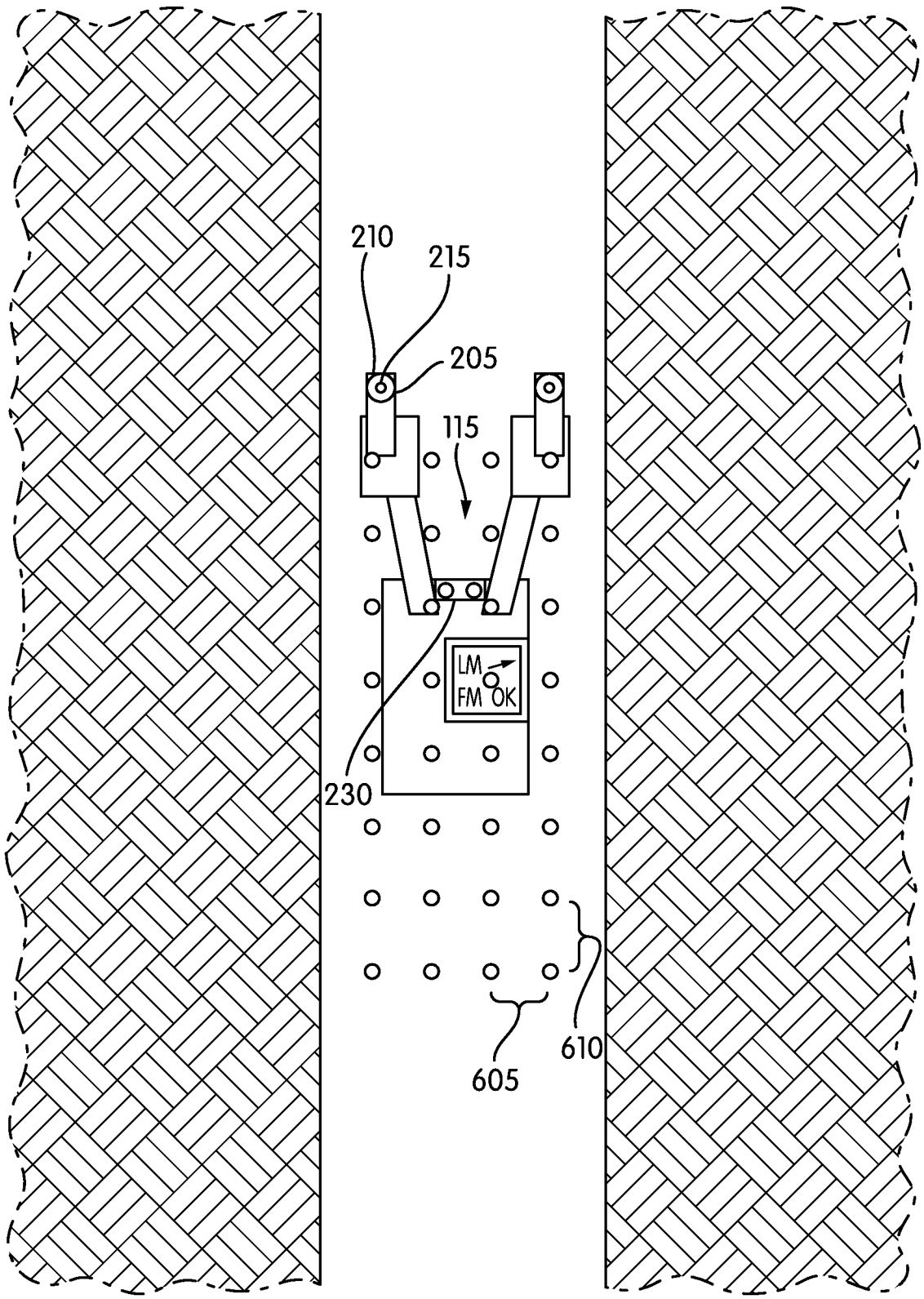
FIG. 3 is a partial, cross-sectional, top view diagram of the industrial machine of FIG. 1 in the mine.

FIGS. 2 and 3 illustrate the industrial machine 100 within mine 200. As illustrated, the bolting apparatus 115 includes a roof bolt drill boom 205, a roof bolter drill 210, and a roof bolter drill bit 215. Although much of the description herein references a roof bolter and the installation of roof bolts, it is understood that the bolts can variously be installed in the side walls or other surfaces of the mine. The roof bolt drill boom 205 couples the bolting apparatus 115 to the chassis 105, and is configured to move the bolting apparatus 115 during operation. The roof bolt drill boom may include a boom actuator 220 (FIG. 4) to promote such movement. In some embodiments, the boom actuator 220 is one or more hydraulic actuators. In other embodiments, the boom actuator 220 may be one or more motors. In yet another embodiment, the boom actuator 220 may be one or more hydraulic actuators in combination with one or more motors.

The bolting apparatus 115 is configured to secure one or more roof bolts 225 into the roof or sidewalls of the mine 200. In some embodiments, installing a roof bolt 225 into the roof or sidewalls of the mine 200 includes, among other things, drilling a hole into a roof or a sidewall of the mine 200 (for example, via the roof bolt drill 210 and roof bolt drill bit 215) and driving a roof bolt 225, along with a resin into the hole. As discussed in more detail below, the industrial machine 100 may further include a sensing system 230 and a user-interface 235.

As illustrated in FIG. 3, in some embodiments, as discussed in further detail below, the roof bolts 225 may be spaced apart from other roof bolts 225 by column spacing 605 as well as by row spacing 610. However, in other embodiments, the roof bolts 225 may have different spacing, or arranged in different matrixes within mine 200.

Figure 4:
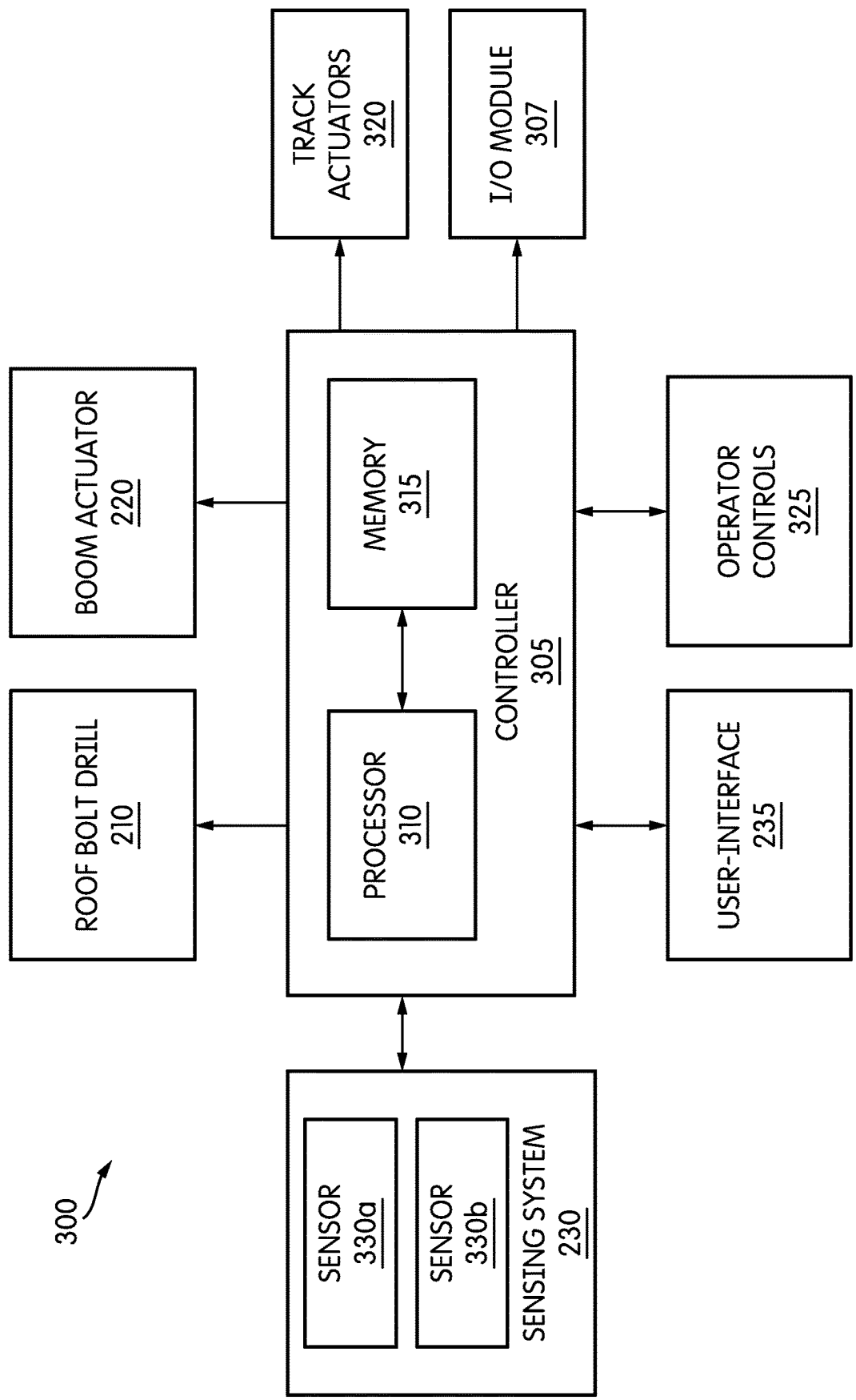
FIG. 4 is a block diagram of a control system of the industrial machine of FIG. 1.

FIG. 4 illustrates a control system 300 of the industrial machine 100 according to some embodiments. The control system 300 includes a controller 305 and an input/output module (I/O) 307. The controller 305 includes a processor 310 and memory 315. The memory 315 stores instructions executable by the processor 310. In some instances, the controller 305 includes one or more of a microprocessor, digital signal processor (DSP), field programmable gate array (FPGA), application specific integrated circuit (ASIC), or the like. The controller 305 is electrically and/or communicatively coupled to the roof bolt drill 210, boom actuator 220, the sensing system 230, the user-interface 235, one or more track actuators 320 for actuating the tracks 110, and one or more operator controls 325.

The sensing system 230 may include one or more sensors 330 (for example, sensors 330a and 330b). The sensors 330 may be any combination of one or more cameras, one or more lasers, and one or more transducers (for example, ultrasonic transducers). The sensing system 230 is configured to use the one or more sensors 330 to detect one or more roof bolts 215 (FIG. 2).

In some embodiments, the one or more sensors 330 are a first camera and a second camera. In such an embodiment, the first camera captures a first image of the mine 200, while the second camera captures a second image of the mine 200. The controller 305 may then determine a location of a roof bolt 225 by using stereo vision of the first image and the second image. For example, the controller 305 may determine the location of the roof bolt 225 by using the following distances: the known distance between the first camera and the second camera; a first pixel location (according to the first image) of the roof bolt 225 (for example, a pixel distance between the roof bolt 225 and a second roof bolt or a pixel distance between a roof bolt 225 and a sidewall of mine 200), and a second pixel location (according to the second image) of the one or more roof bolts 225 (for example, a pixel distance between the roof bolt 225 and a second roof bolt or a pixel distance between a roof bolt 225 and the sidewall of mine 200).

In some embodiments, the one or more sensors 330 include a camera and a laser measuring device, or a transducer. In such an embodiment, the camera captures an image of the mine 200, while the laser measuring device, or transducer, determines a distance between the industrial machine 100 to a point of the mine 200 (for example, a roof bolt 225 or a roof of the mine 200) captured within the image. Based on the captured image and the determined distance, the controller 305 may determine a location of the roof bolt 225 within the mine 200. For example, although the captured image may provide a location of the roof bolt 225 (for example, a pixel distance between roof bolts 225 or a pixel distance between the roof bolt 225 and a sidewall of mine 200), by using the determined distance, via the laser measuring device or transducer, from the industrial machine 100 to a known point in the captured image, the pixel distance may be converted to an actual distance (for example, meters).

In some embodiments, the one or more sensors 330 include a camera and a laser (for example, a laser pointer) located a known distance from the camera. In such an embodiment, the camera captures an image of the mine 200, while the laser projects a mark (for example, a dot) at a point of the mine 200 (for example, a roof bolt 225 or a roof of the mine 200) captured within the image. The controller 305 may then determine a pixel distance between the mark in the captured distance and a known point (for example, a center point) of the captured image. Based on the pixel distance between the mark and known point, and the known distance between the camera and laser, the controller 305 may convert the pixel distance to an actual distance. The controller 305 may then use that actual distance to determine an actual distance between other objects in the captured image, for example, the actual distance between roof bolts 225 and/or the actual distance between a roof bolt 225 and a sidewall of the mine 200.

In some embodiments, the one or more sensors 330 include a single camera. In such an embodiment, the camera captures an image of the mine 200. Based on the captured image, and a known dimension of a roof bolt 225, the controller 305 may determine a location of the roof bolt 225 within the mine 200. For example, although the captured image may provide a location of the roof bolt 225 (with respect to other roof bolts 225 or a sidewall of mine 200) with respect to an image pixel matrix (for example, a known image pixel matrix used by the camera, or a known image area captured by the camera), by using the known dimension of the roof bolt 225, the image pixel matrix of the captured image may be converted to an actual size matrix (for example, a meter by meter matrix).

The user-interface 235 provides information to the operator about the status of the industrial machine 100 and other systems communicating with the industrial machine 100. For example, other systems may include other industrial machines and user-personal devices (for example, including external computers, laptops, tablets, smartphones, etc.). The user-interface 235 includes one or more of the following: a display (e.g. a liquid crystal display (LCD)); one or more light emitting diodes (LEDs) or other illumination devices; a heads-up display; speakers for audible feedback (e.g., beeps, spoken messages, etc.); tactile feedback devices such as vibration devices that cause vibration of the operator's seat or operator controls 325; or other feedback devices.

The operator controls 325 receive operator input via one or more input devices and output control signals to the controller 305 based on the operator input. Upon receiving the control signals, the controller 305 controls, among other things, the roof bolt drill 210, the boom actuator 220, and the track actuators 320.

The input/output (I/O) module 307 is configured to provide communication between the controller 305 and outside devices (for example, a laptop, a smartphone, a tablet, an external server, or an external computer system). In some embodiments, the I/O module 307 provides communication via a network. In such an embodiment, the network may be a wide area network (WAN), such as but not limited to, the Internet. In other embodiments, the network may be a local area network (LAN), a neighborhood area network (NAN), a home area network (HAN), a vehicular area network (VAN), or personal area network (PAN) employing any of a variety of communications protocols, such as WiFi®, Bluetooth®, ZigBee®, and the like.

In one embodiment of operation, the controller 305 uses the sensing system 230 to determine a location of one or more roof bolts 215. The controller 305, based on the location, controls at least one of the roof bolt drill 210, the boom actuator 220, and the track actuators 320, to install a subsequent roof bolt. In another embodiment of operation, the controller 305, based on the location, provides feedback to an operator via the user-interface 235. The operator then uses the operator controls 325 to install a subsequent roof bolt using the feedback.

Figure 5:
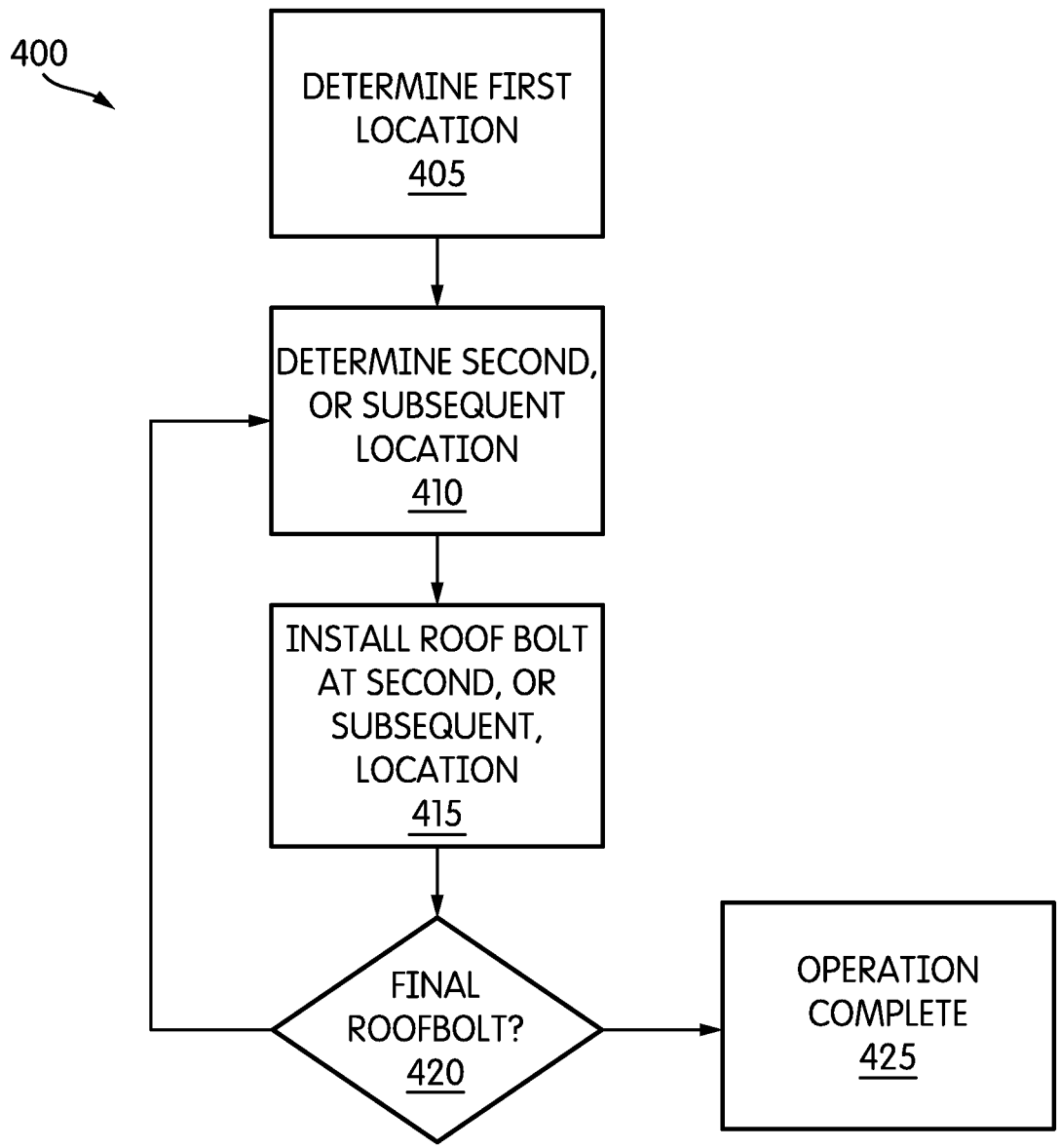
FIG. 5 is a flow chart illustrating a process effectuated by the control system of the industrial machine of FIG. 1.
Figure 6:
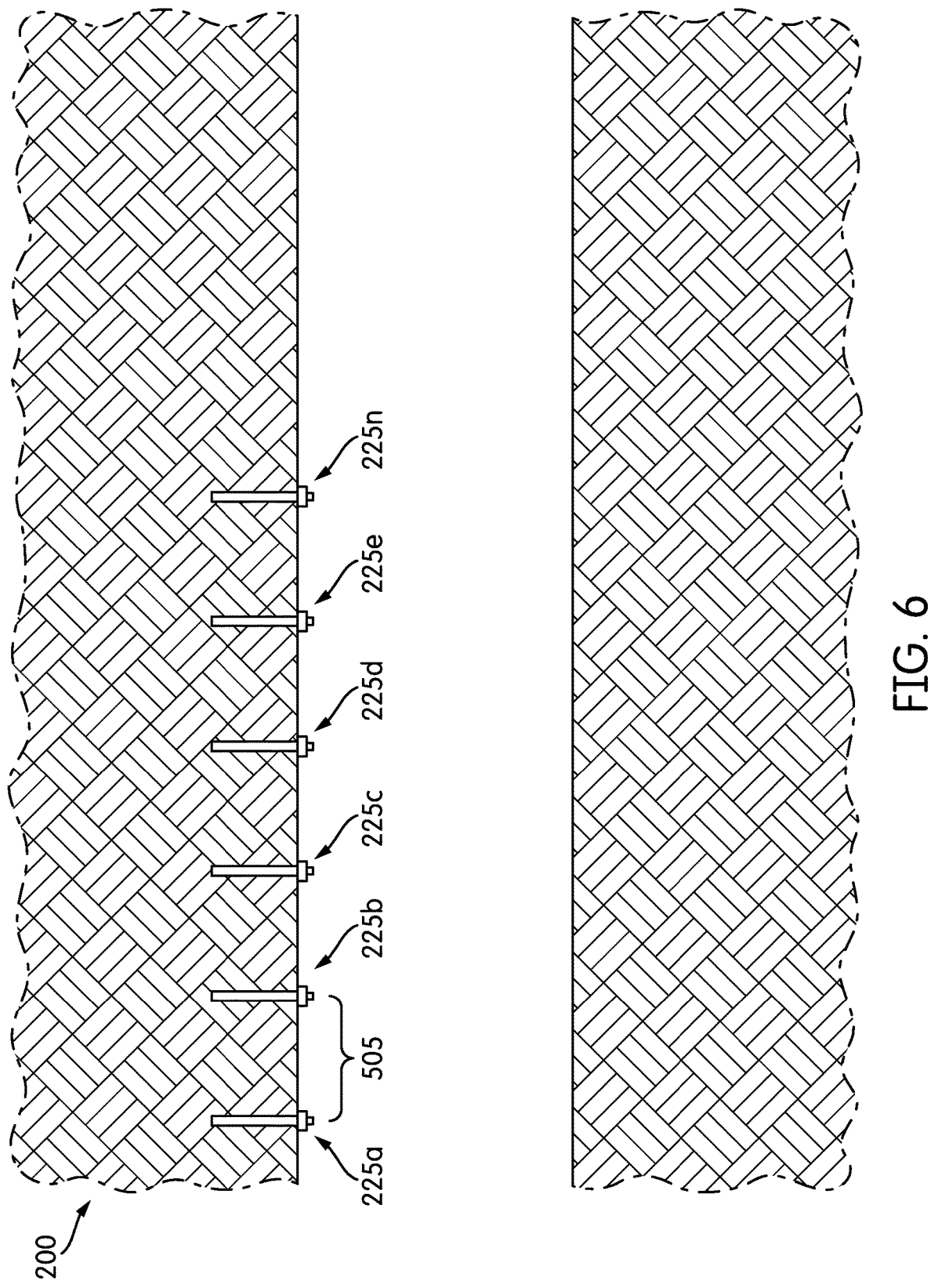
FIG. 6 is a partial, cross-sectional, side view diagram of a mine illustrating bolt positions in the mine roof.
Figure 7:
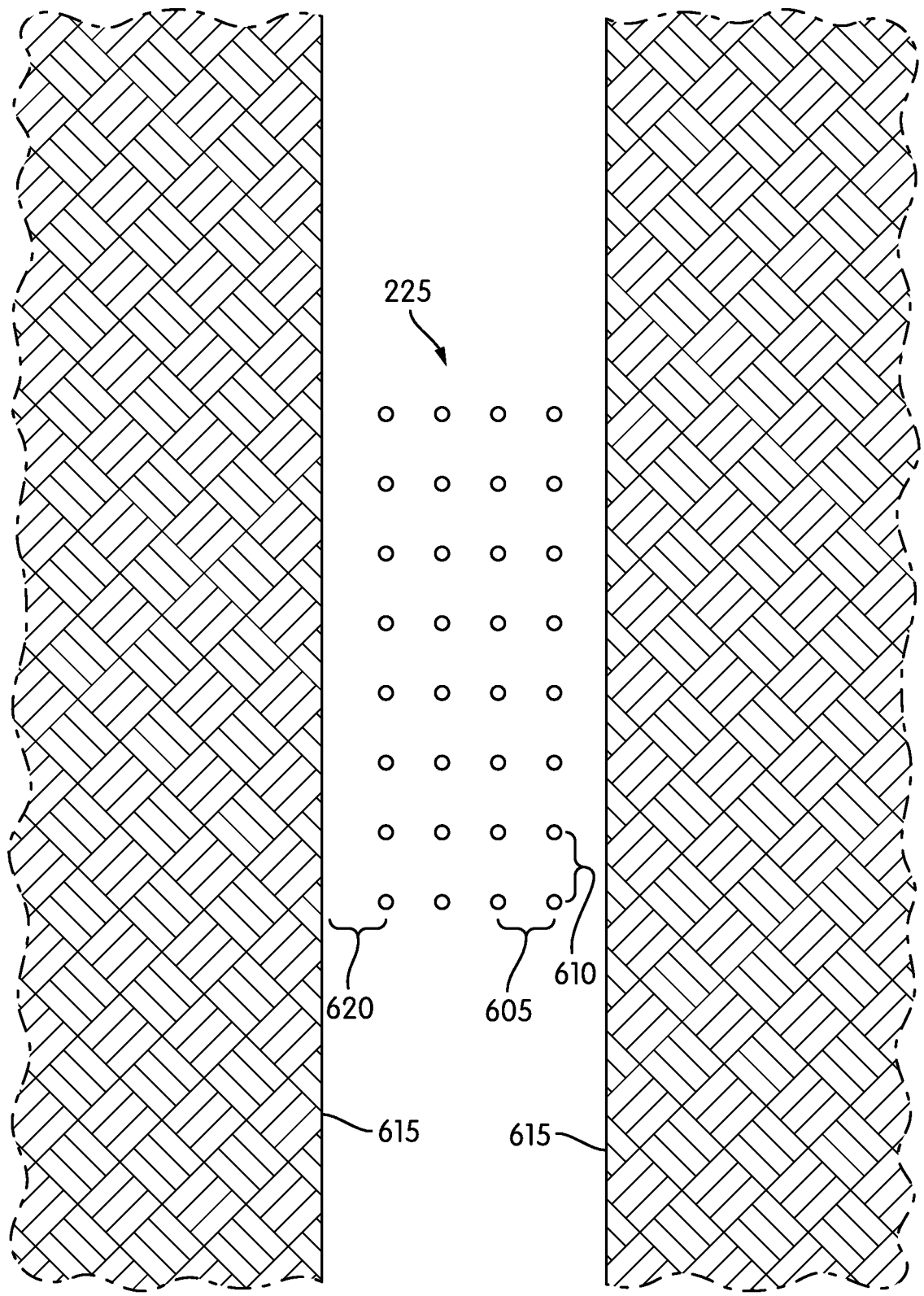
FIG. 7 is a partial, cross-sectional, top view diagram of a mine illustrating one embodiment of a roof bolt plan.

FIG. 5 illustrates a process, or operation, 400 of the industrial machine 100 according to some embodiments. It should be understood that the order of the steps disclosed in process 400 could vary. Although illustrated as occurring in parallel order, in other embodiments, the steps disclosed may be performed in serial order. Furthermore, additional steps may be added to the process and not all of the steps may be required. A first location of a first roof bolt 225*a* (FIG. 5) is determined using the sensing system 230 (block 405). A second, or additional, location of a second, or subsequent, roof bolt 225*b* (FIG. 6) is determined using the sensing system 230 (block 410). As illustrated in FIG. 7, roof bolts 225 may be spaced apart from other roof bolts 225 by column spacing 605 as well as by row spacing 610. Additionally, roof bolts 225 may be spaced from a side wall 615 by a side wall spacing 620. In some embodiments, the predetermined first and second distances 505, 510 may be determined based on a roof bolting plan. The second roof bolt 225*b* is then installed at the second location (block 415). A determination is then made as to whether the second roof bolt 225*b* is the final roof bolt to be installed (block 420). If the second roof bolt 225*b* is the final roof bolt to be installed, then operation is complete (block 425). If subsequent roof bolts (for example, 225*a*, 225*b*, 225*c*, 225*d*, 225*e*, . . . 225*n*) are necessary, operation 400 reverts back to block 410.

In some embodiments, once a location is determined by controller 305, feedback is provided to the user via the user-interface 235. The user may then operate the operator controls 325 to position the roof bolt boom 205, roof bolter drill 210, and roof bolter drill bit 215, and install one or more roof bolts 225. In another embodiment, once a location is determined by controller 305, the controller 305 automatically controls the industrial machine 100, including the roof bolt boom 205, roof bolter drill 210, and roof bolter drill bit 215, to install one or more roof bolts 225. The automatic installation of the subsequent bolts can be based on discrete measurements from the previously installed roof bolt, or be based on a predetermined placement plan stored in the controller 305. In yet another embodiment, once a location is determined by controller 305, the industrial machine 100 marks the location on the mine 200. For example, the industrial machine 100 may use paint, or similar marking material, to mark the mine 200 with one or more identifications (for example, one or more numbers) associated with the locations. This marking may occur either during installation of the bolt, or post-installation during an inspection to detect bolt locations. In some embodiments, the industrial machine 100, or another mining machine, may use the one or more identifications to assist in tracking the position of the roof bolts, in order to determine, post-installation, whether the roof bolts have been installed correctly, and according to mining regulations, a predetermined placement plan or established spacing criteria.

Figure 8:
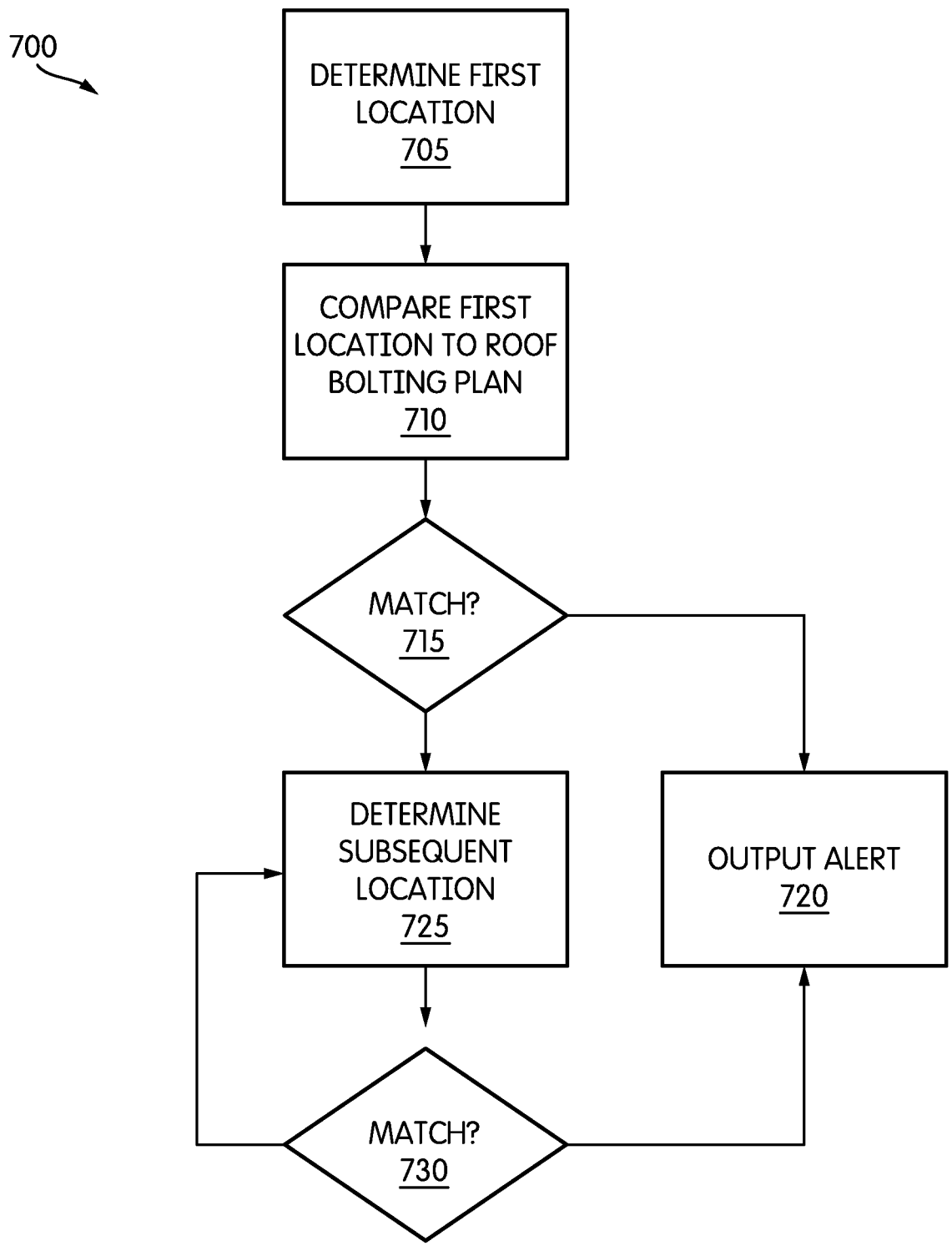
FIG. 8 is a flow chart illustrating a process of locating roof bolts and comparing to a roof bolt plan performed by the industrial machine of FIG. 1.

FIG. 8 illustrates a process, or operation, 700 of the industrial machine 100 according to some embodiments. It should be understood that the order of the steps disclosed in process 700 could vary. Although some steps are illustrated as occurring in parallel order, in other embodiments, the steps disclosed may be performed in serial order, or vice versa. Furthermore, additional steps may be added to the process and not all of the steps may be required. A first location of a first roof bolt 225*a* is determined using the sensing system 230 (block 705). The first location is then compared to the roof bolting plan, or alternatively, pre-established spacing criteria (block 710). A determination is then made as to whether the first location matches the roof bolting plan or spacing criteria (block 715). If the first location does not match the roof bolting plan or spacing criteria, an alert is output (block 720). In some embodiments, the alert may be output via the user-interface 235. If the first location matches the roof bolting plan, a subsequent location of a subsequent roof bolt (for example roof bolt 225*b*, 215*c*, . . . 215*n*) is determined using the sensing system 230 (block 725). A determination is then made as to whether the subsequent location matches the roof bolting plan (block 730). If the subsequent location does not match the roof bolting plan, an alert is output (block 720). If the subsequent location matches the roof bolting plan, process 700 cycles back to block 725 until all of the roof bolts are located.

Figure 9:
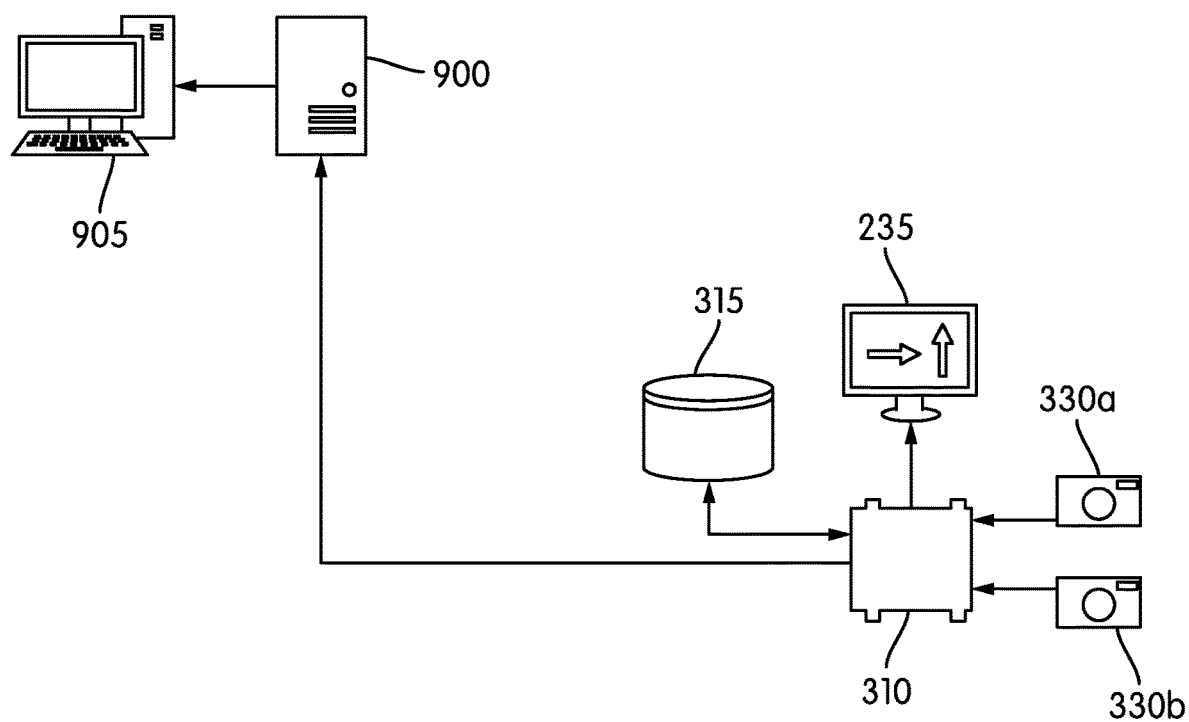
FIG. 9 is a block diagram of the industrial machine of FIG. 1 illustrating the industrial machine communicatively coupled to an external server and/or an external computer.

FIG. 9 is a block diagram of industrial machine 100 communicatively coupled to an external server 900 and/or external computer 905, via a network. In some embodiments of operation, as the industrial machine 100 travels through the mine 200, the industrial machine 100 continuously senses, via the sensing system 230, the one or more roof bolts 225. In some embodiments, the sensed information of the roof bolts 225 may include photographs of the roof bolts 225. The sensed information may then be stored in memory 315 and/or output to the external server 900 and/or external computer 905, via a network and I/O module 307. In such an embodiment, the sensed information may then be used to create a roof bolting report that may be displayed on the external computer 905. As discussed above in more detail, although illustrated as having two cameras, in other embodiments, sensing system 230 (including sensors 330*a*, 330*b*) may include any combination of one or more cameras, one or more lasers, and one or more ultrasonic transducers.

Figure 10:
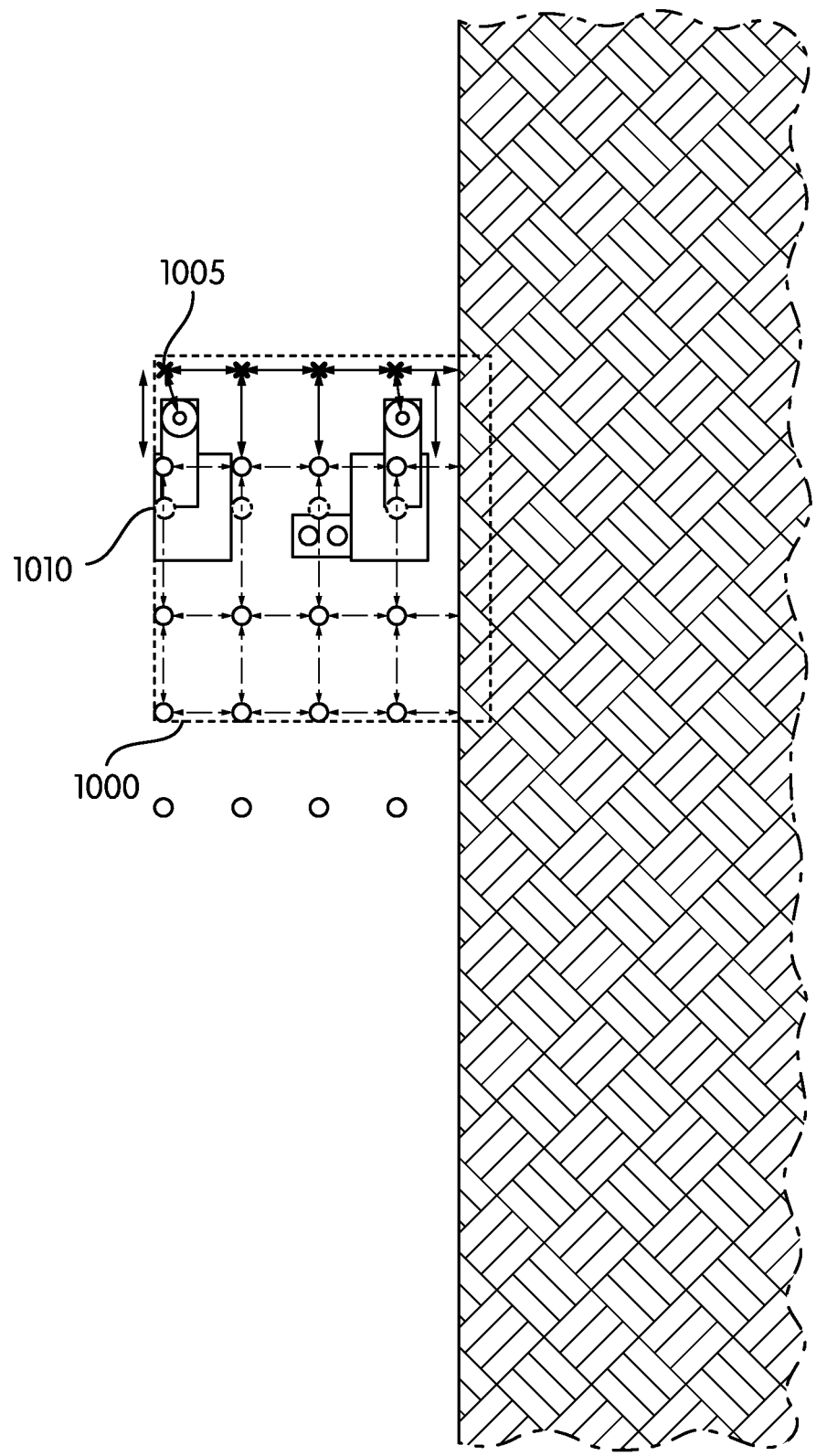
FIG. 10 is a partial, cross-sectional, top view diagram of the industrial machine of FIG. 1 in the mine.

FIG. 10 is a partial, cross-sectional, top view diagram of the industrial machine of FIG. 1 within a mine according to some embodiments. As illustrated, the sensing system 230 may have a visibility area 1000. The sensing system 230 may analyze one or more roof bolts 225 simultaneously that are within the visibility area 1000. Additionally, the industrial machine 100 may then determine roof bolt locations 1005 within the visibility area 1000. In some embodiments, the industrial machine 100 may also determine a position 1010 where roof bolts 225 should have been installed according to a roof bolt plan or other pre-established spacing criteria. Thus, in some embodiments, the industrial machine 100 may determine roof bolt locations 1005, while simultaneously measuring and comparing previously installed roof bolts 225 to a roof bolting plan or other pre-established spacing criteria. In other embodiments, the industrial machine 100 may simultaneously establish the location of and install a new roof bolt based on a prior roof bolt location or locations, and determine whether previously installed roof bolts match a roof bolting plan or other spacing criteria.

Thus, the invention provides, among other things, a method and system for installing roof bolts and inspecting installed roof bolts. Various features and advantages of the invention are set forth in the following claims.

What is claimed is:

1. An industrial machine comprising:
   a bolter supported by a chassis;
   a first sensor configured to acquire first data relating to a mine surface, wherein the first sensor is a camera and the first data is an image of the mine surface;
   a second sensor configured to acquire second data relating to the mine surface; and
   a controller connected to the first sensor and to the second sensor, the controller configured to:
      analyze the first data and the second data to determine locations of a first bolt and a second bolt on the mine surface; and
      determine a new bolt location on the mine surface for a third bolt based on the location of the first bolt, the location of the second bolt, the first data, and the second data.

2. The industrial machine of claim 1, wherein the first sensor is located at a predetermined distance from the second sensor, and wherein the controller is configured to base an identification of a physical distance between the first bolt and the second bolt on the predetermined distance.

3. The industrial machine of claim 1, wherein the second sensor is a second camera, the second data is a second image of the mine surface, and the second image includes the first bolt and the second bolt.

4. The industrial machine of claim 1, wherein the second data is a distance from the second sensor to the mine surface.

5. The industrial machine of claim 1, wherein the controller is further configured to:
   control the bolter to install the third bolt at the new bolt location.

6. The industrial machine of claim 5, wherein the controller is further configured to control the bolter to install the third bolt based on a bolt plan.

7. The industrial machine of claim 1, wherein the second sensor is configured to measure distance and the second data is a distance measurement, and wherein the second sensor is an ultrasonic transducer.

8. The industrial machine of claim 1,
   wherein the mine surface is a roof of a mine, the mine further includes a sidewall, and the image further includes at least a portion of the sidewall, and
   wherein the controller is further configured to:
      analyze the first data to identify the presence of the sidewall of the mine in the image;
      determine a pixel distance between the first bolt and the sidewall in the image; and
      identify a physical distance between the first bolt and the sidewall based on the pixel distance and the second data.

9. The industrial machine of claim 1, further comprising a user-interface for providing feedback to a user,
   wherein the controller is further configured to
      provide feedback to a user, via the user-interface, based on the new bolt location to enable installation of the third bolt at the new bolt location.

10. An industrial machine comprising:
    a bolter supported by a chassis;
    a sensor configured to acquire first data relating to a mine surface of a mine, wherein the sensor is a camera and the first data is an image of the mine surface;
    an ultrasonic transducer for determining second data, wherein the second data includes a distance from the ultrasonic transducer to a point of the mine surface; and
    a controller connected to the sensor and the ultrasonic transducer, the controller configured to:
       analyze the first data to identify the presence of a first bolt and a second bolt in the image of the mine surface;
       determine a pixel distance between the first bolt and the second bolt in the image of the mine surface;
       identify a physical distance between the first bolt and the second bolt based on the pixel distance and the second data;
       identify a location of the first bolt and a location of the second bolt; and
       determine a new bolt location on the mine surface for a third bolt based on the location of the first bolt, the first data, and the second data.

11. The industrial machine of claim 10, wherein the controller is configured to control the bolter to install the third bolt at the new bolt location.

12. The industrial machine of claim 10, further comprising a user-interface for providing feedback to a user, wherein the controller is further configured to provide feedback to a user, via the user-interface, based on the new bolt location to enable installation of the third bolt at the new bolt location.

13. The industrial machine of claim 10, wherein the controller is configured to determine the new bolt location on the mine surface for the third bolt based on the location of the first bolt, the location of the second bolt, the first data, and the second data.

14. The industrial machine of claim 13, further comprising a user-interface for providing feedback to a user, wherein the controller is further configured to provide feedback to a user, via the user-interface, based on the new bolt location to enable installation of the third bolt at the new bolt location.

\* \* \* \* \*